(12) United States Patent
Quiring et al.

(10) Patent No.: US 7,556,012 B2
(45) Date of Patent: Jul. 7, 2009

(54) COUNTERWEIGHT ARRANGEMENT FOR AN INTERNAL COMBUSTION ENGINE IN A MOTOR VEHICLE

(75) Inventors: Stefan Quiring, Leverkusen (DE); Harald Stoffels, Cologne (DE); Klaus P Kuepper, Dormagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/943,337

(22) Filed: Nov. 20, 2007

(65) Prior Publication Data

US 2008/0115757 A1    May 22, 2008

(30) Foreign Application Priority Data

Nov. 20, 2006    (EP)    .................... 06124387

(51) Int. Cl.
*F02B 75/06*    (2006.01)
(52) U.S. Cl. ...................... 123/192.2; 74/603
(58) Field of Classification Search .............. 123/192.2; 74/603
See application file for complete search history.

(56) References Cited

FOREIGN PATENT DOCUMENTS

| DE | 10245376 | 5/2003 |
|---|---|---|
| JP | 55-006035 | 1/1980 |
| JP | 04-249637 | 9/1992 |

*Primary Examiner*—Noah Kamen
(74) *Attorney, Agent, or Firm*—Allan Lippa; Alleman Hall McCoy Russell & Tuttle LLP

(57) ABSTRACT

A counterweight arrangement for an internal combustion engine with three cylinders. The internal combustion engine having a crankshaft rotating about an axis of rotation, with three cranks which succeed one another in the axial direction with respect to the axis of rotation and are distributed at angular intervals of 120° and each crank corresponding to a respective cylinder, the counterweight arrangement including at least two counterweights for at least partial compensation of inertia forces caused by rotating masses on the crankshaft, wherein exactly two counterweights are provided for the two outer cranks, at least one of the two counterweights being arranged in a position which is rotated about the crankshaft axis with respect to an assigned crank through angle ($\alpha_{counter}$), the amount of which differs from 30°+N*180°, N being equal to a natural number or equal to zero.

18 Claims, 8 Drawing Sheets

COUNTERWEIGHT ARRANGEMENT FOR AN INTERNAL COMBUSTION ENGINE IN A MOTOR VEHICLE

The present application claims priority to European Patent Application No. 06124387.9, titled "Counterweight arrangement for an internal combustion engine in a motor vehicle", filed Nov. 20, 2006, the entire contents of which are incorporated herein by reference.

BACKGROUND

The present disclosure relates to a counterweight arrangement for an internal combustion engine in a motor vehicle. The disclosure relates, furthermore, to a method for optimizing the vibration behavior in an internal combustion engine with three cylinders.

Counterweight arrangements of this type serve for reducing or preventing vibrations occurring in an internal combustion engine, which, in a three-cylinder engine, are exerted, particularly in the form of a pair of inertia forces, on the crankshaft by the first and the third cylinder.

DE 32 32 027 A1 discloses a counterweight arrangement for internal combustion engines with three cylinders, in which, on the one hand, a countershaft with compensating weights fastened rigidly at its two ends is provided, which rotates at the same rotational speed as the crankshaft and in a direction opposite to this, and in which, additionally, counterweights are fastened to both ends of the crankshaft in order to compensate the reciprocating or rotating masses.

FR 2 779 493 A1 discloses a crankshaft which has a plurality of cranks and, at one end, an inertia flywheel which in one region has a material clearance, in order to generate a first force (gravitational force) acting eccentrically from the counterweight, and in which is provided, spaced apart axially from the inertia flywheel, a region with additional material or additional mass, in order to generate a second force (gravitational force) acting eccentrically from the counterweight.

DE 44 43 707 A1 discloses a low-vibration three-cylinder in-line internal combustion engine, in which the cranks for the three pistons lie in a common plane, the cranks for the two outer pistons forming a crank angle of 180° with respect to the crank for the middle piston, and the dimensions of the middle piston corresponding to the sum of the dimensions of the outer pistons.

DE 102 45 376 A1 discloses a crankshaft for a three-cylinder in-line reciprocating-piston engine, in which, to reduce the bearing loads on the crankshaft bearings, only two compensating masses are provided, which form an angle of 180° and generate equal and opposite compensating forces, the compensation plane formed by the compensating forces forming an angle of 30° with the first crank.

In an internal combustion engine without a balancing shaft, however, the vibrations occurring are not reduced to a minimum by counterweights forming an angle of 30° respectively with the first and the third crank or with the first and the third cylinder, when, as is usually the case in a transversely installed drivetrain, the crankshaft axis does not coincide with the main axis of the inertia matrix of the drivetrain, that is to say when the inertia matrix has non-diagonal elements which are unequal to zero.

SUMMARY

An object of one embodiment of the present disclosure is to provide a counterweight arrangement for an internal combustion engine in a motor vehicle, which allows a more effective reduction of the vibrations occurring in the internal combustion engine, even when the crankshaft axis does not coincide with the main axis of the inertia matrix of the drivetrain.

In one approach, this object is achieved according to the features of independent claim 1. In a counterweight arrangement according to the present disclosure for an internal combustion engine with three cylinders, the internal combustion engine having a crankshaft rotating about an axis of rotation, with three cranks which succeed one another in the axial direction with respect to the axis of rotation and are distributed at angular intervals of 120° and of which each crank is assigned in each case to one of the three cylinders, the counterweight arrangement has at least two counterweights for the at least partial compensation of the inertia forces caused by rotating masses on the crankshaft.

The counterweight arrangement is defined in that exactly two counterweights are provided, each of which is assigned in each case to another of the two outer cranks, at least one of the two counterweights being arranged in a position which is rotated about the crankshaft axis with respect to the assigned crank through an angle, the amount of which differs from $30°+N*180°$, N being equal to a natural number or equal to zero.

The present disclosure is based on the recognition that the optimal mass and the optimal position of the counterweights in a counterweight arrangement for a three-cylinder engine are dependent directly on the inertia matrix of the drivetrain and on the oscillating masses. More precisely, the inertia matrix of the drivetrain then has an appreciable influence on the position and mass of the counterweights if the axis of rotation of the crankshaft does not coincide with the main inertia axis of the inertia matrix of the drivetrain.

A reduction in the vibrations occurring in the internal combustion engine is achieved, according to the present disclosure, in that the position and mass of the counterweights are determined as a function of the inertia matrix of the drivetrain, and there is a deliberate move away from the customary 30° position of the counterweights in relation to the first and the third cylinder or in relation to the assigned crank, in order to achieve optimal noise, vibration, harshness (NVH) properties.

The disclosure relates, furthermore, to a method for optimizing the vibration behavior in an internal combustion engine with three cylinders according to the features of the independent claim 5.

Further refinements of the disclosure may be gathered from the description and the sub-claims.

BRIEF DESCRIPTION OF THE DRAWINGS

The disclosure is explained below by means of preferred embodiments, with reference to the accompanying figures in which.

DETAILED DESCRIPTION

Figure 1:
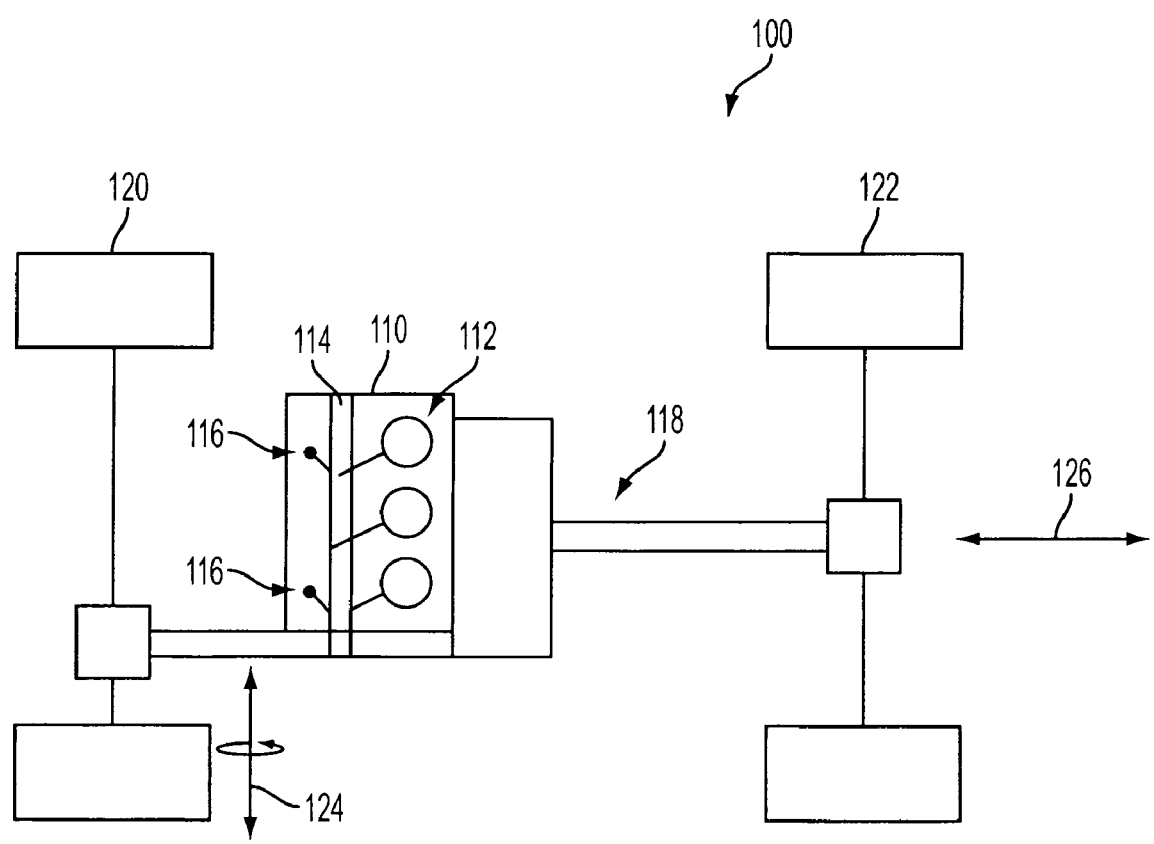
FIG. 1 shows a schematic illustration of one embodiment of a vehicle system of the present disclosure.

FIG. 1 schematically shows an exemplary embodiment of a vehicle system 100 of the present disclosure. Vehicle system 100 may include an internal combustion engine 110. Engine 110 may include three cylinders 112. Each of cylinders 112 may include a reciprocating piston that may be operatively coupled with a respective crank of crankshaft 114. In one particular example, the cranks may be distributed at angular intervals of 120° of the crankshaft. Further, crankshaft 114 may include a counterbalance arrangement 116 to balance out directional force created by imbalanced combustion of the cylinders during engine operation. By balancing out the directional force of the engine NVH conditions be reduced resulting in improved driveability. In one particular example, the counterbalance arrangement may include two counterweights and each counterweight may correspond to an outer crank of the crankshaft. The position and mass of the counterweights will be discussed in further detail below with reference to FIGS. 3-5.

Note that in some embodiments, the three cylinder internal combustion engine may not include a balancing shaft with counterweights to balance forces of the engine. Further, in some embodiments, the counterweight arrangement may be integral with the crankshaft.

Continuing with FIG. 1, crankshaft 114 may be in operative communication with a drivetrain 118. Drivetrain 118 may be coupled to front wheels 120 and/or rear wheels 122. Thus, during engine operation, power output of the engine may be distributed via drivetrain 118 to the wheels to propel the vehicle system. In some embodiments, engine 110 may be configured to provide power to the front wheels in what may be referred to as a front wheel drive configuration. In some embodiments, engine 110 may be configured to provide power to the front wheels and the rear wheels in what may be referred to as an all wheel drive configuration.

In the illustrated embodiment, internal combustion engine 110 may be oriented transversely in vehicle system 100. That is, internal combustion engine 110 may be oriented such that a crankshaft 114 of the engine may be oriented parallel to the axis of rotation of the wheels 120 and 122 of the vehicle. Since the engine may be oriented transversely the axis of rotation 124 of crankshaft 114 may not coincide with the main inertia axis of the inertia matrix of the drivetrain. It will be appreciated that the main inertia axis of the inertia matrix of the drivetrain may coincide with the longitudinal direction of the vehicle and may be generally reference at 126.

As discussed above, the optimal mass and the optimal position of the counterweights in a counterweight arrangement for a three-cylinder engine may be dependent directly on the inertia matrix of the drivetrain and on the oscillating masses. More precisely, the inertia matrix of the drivetrain then has an appreciable influence on the position and mass of the counterweights if the axis of rotation of the crankshaft does not coincide with the main inertia axis of the inertia matrix of the drivetrain. Optimization of position and mass of counterweights in a counterbalance arrangement based on a rotational axis of the crankshaft not coinciding with a main inertia axis of the inertia matrix of the drivetrain will be discussed in further detail herein below.

Figure 2:
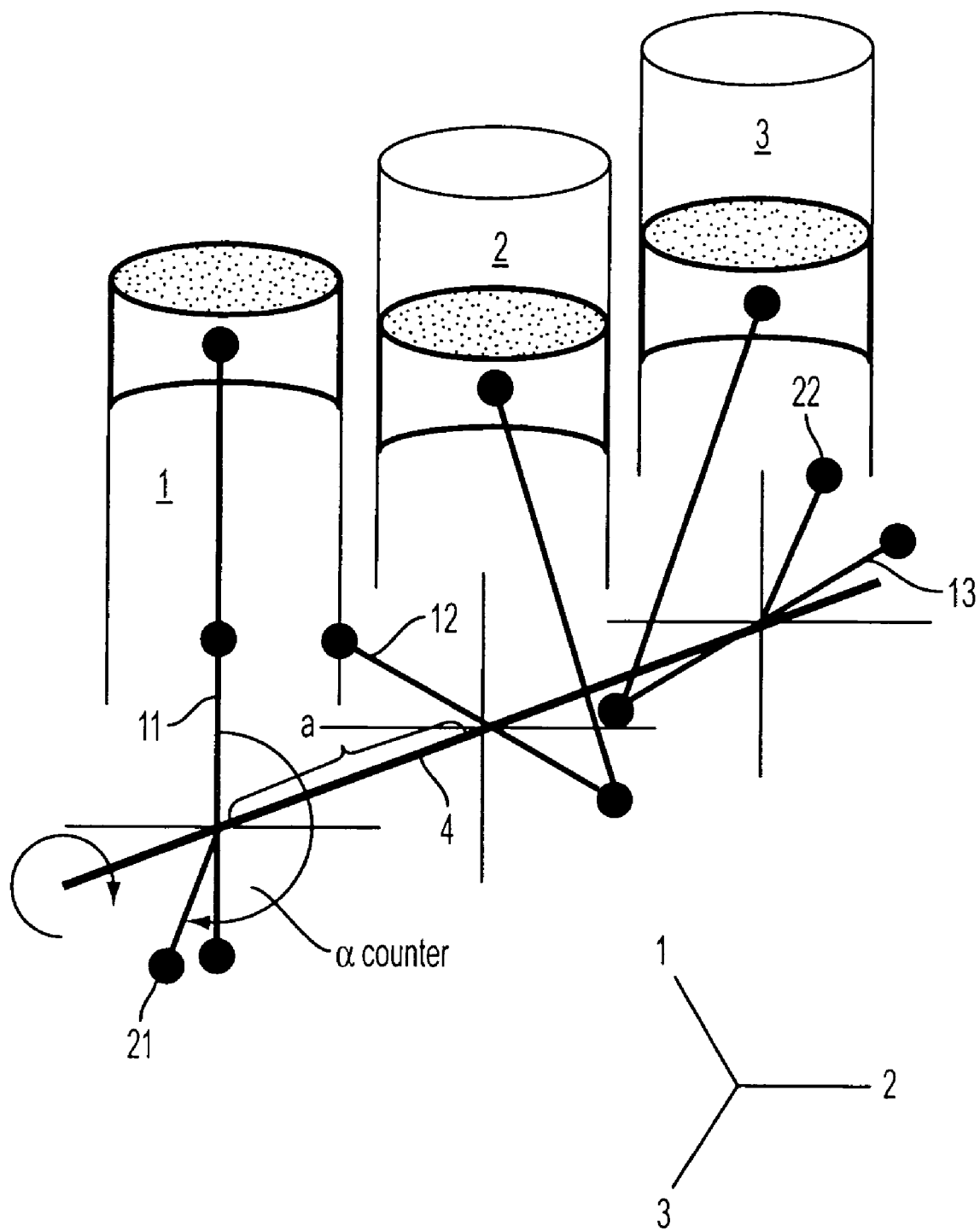
FIG. 2 shows a diagrammatic illustration of a crankshaft, provided with a counter weight arrangement according to the disclosure, for an internal combustion engine with three cylinders.

FIG. 2 diagrammatically illustrates a crankshaft according to the present disclosure, provided with a counterweight arrangement comprising two counterweights 21 and 22, for an internal combustion engine with three cylinders 1, 2 and 3.

When the internal combustion engine is in operation, the crankshaft rotates about an axis of rotation 4 and has in the axial direction, with respect to the axis of rotation 4, three successive cranks 11, 12 and 13 which are illustrated lineally in simplified form in FIG. 2 and are distributed about the axis of rotation 4 at angular intervals of 120°. The counterweights 21 and 22 serve for the at least partial compensation of the inertia forces caused by the rotating masses on the crankshaft and are arranged at an angle of 180° with respect to one another, that is to say in a common plain which runs perpendicularly with respect to the axis of rotation 4.

The angle through which the first counterweight 21 of the two counterweights 21 and 22 is rotated about the crankshaft axis 4 with respect to the assigned crank 11 is designated by $\alpha_{counter}$.

It is clear from the accompanying figures that optimal NVH properties are not achieved in the initially described 30° position, used conventionally, of the counterweights in relation to the first and the third cylinder, but, instead, in positions of the counterweights which deviate from this.

By means of an exemplary embodiment, then, it is explained below how a reduction in the vibrations occurring in the internal combustion engine is achieved according to the present disclosure, in that in each case an ideal position and mass of the counterweights 21, 22 is determined as a function of the inertia matrix of the drivetrain.

The following relation between the inertia matrix I of the drive, the momental vector $\vec{M}$ and the angular acceleration vector $\vec{\ddot{\varphi}}$ applies:

$$\begin{pmatrix} I_{xx} & I_{xy} & I_{xz} \\ I_{yx} & I_{yy} & I_{yz} \\ I_{zx} & I_{zy} & I_{zz} \end{pmatrix} \cdot \begin{pmatrix} \ddot{\varphi}_x \\ \ddot{\varphi}_y \\ \ddot{\varphi}_z \end{pmatrix} = \begin{pmatrix} M_x \\ M_y \\ M_z \end{pmatrix} \quad (1)$$

thus resulting for the angular acceleration vector $\vec{\ddot{\varphi}}$ in:

$$\begin{pmatrix} \ddot{\varphi}_x \\ \ddot{\varphi}_y \\ \ddot{\varphi}_z \end{pmatrix} = \begin{pmatrix} I_{xx} & I_{xy} & I_{xz} \\ I_{yx} & I_{yy} & I_{yz} \\ I_{zx} & I_{zy} & I_{zz} \end{pmatrix}^{-1} \cdot \begin{pmatrix} M_x \\ M_y \\ M_z \end{pmatrix} \quad (2)$$

The momental vector $\vec{M}$ arises generally from the geometry of the crank mechanism, the oscillating masses $m_{osc}$ and the masses $m_{counter}$ of the counterweights 21 and 22, for the present case without a compensating shaft, as follows:

$$M_{vert} = 1.5 \cdot m_{osc} \cdot r \cdot \omega^2 \cdot a - 2 \cdot m_{counter} \cdot r \cdot \omega^2 \cdot a \cdot \cos(\alpha_{counter}) \quad (3)$$

$$M_{hor} = 2 \cdot m_{counter} \cdot r \cdot \omega^2 \cdot a \cdot \sin(\alpha_{counter}) \quad (4)$$

In this instance, the variable a designates the bore spacing depicted in FIG. 2, $m_{osc}$ the oscillating mass in one of the cylinders 1, 2, and 3 in each case, $m_{counter}$ the mass of each of the counterweights 21, 22, $\alpha_{counter}$ the angle, depicted in FIG. 2, of the counterweight 21 in relation to the assigned crank, $\omega$ the angular speed of the crankshaft rotation and r the crankshaft radius. In order to take into account the moments for a 360° crankshaft rotation, the moments must be considered in complex form, that is to say in each case with a real and an imaginary part, since the crankshaft position varies with maximum excitation as a function of the involved masses.

The exemplary embodiment described below, then, is based on the following exemplary inertia matrix I of the drive:

$$I = \begin{pmatrix} 10 & 1 & 2 \\ 1 & 5 & -1 \\ 2 & -1 & 8 \end{pmatrix} \quad (5)$$

the above variables being based on the values a=0.08 m, $m_{osc}$=0.5 kg and r=0.05 m.

Figure 3A:
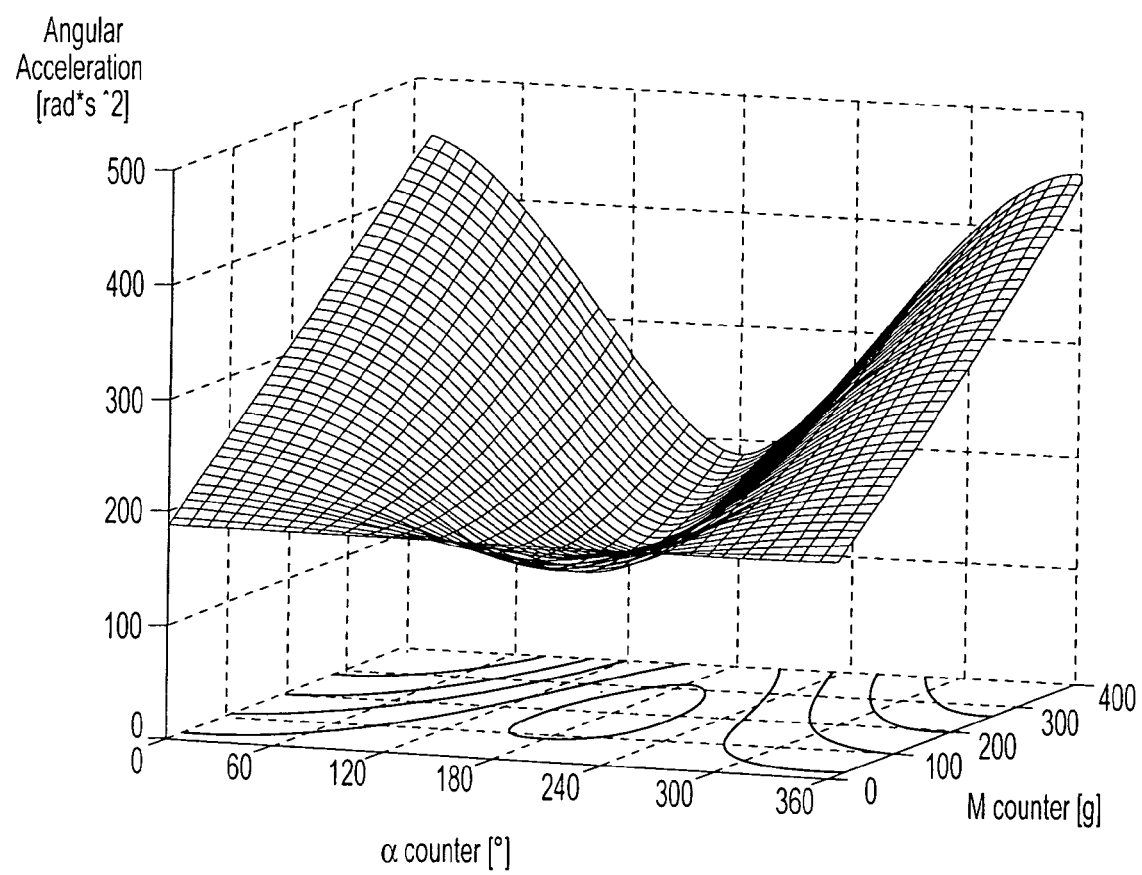
FIGS. 3-5 show graphs to illustrate the dependence of the angular acceleration on the position and mass of the counterweights for an ideal case with vanishing elements of the secondary diagonals of the inertia matrix (FIGS. 3b and 5a-5b) and a real case with non-vanishing elements of the secondary diagonals of the inertia matrix (FIGS. 3a and 4a-4b).
Figure 3B:
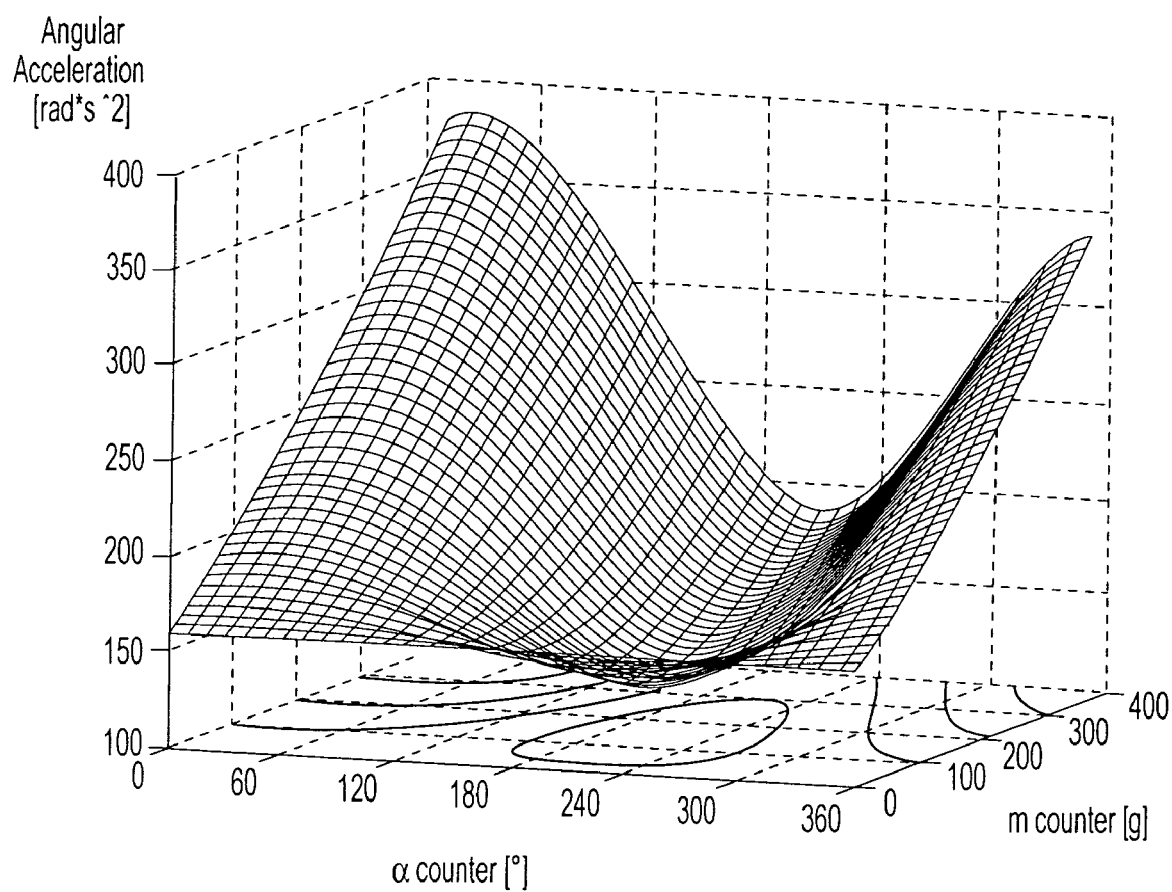
Figure 4A:
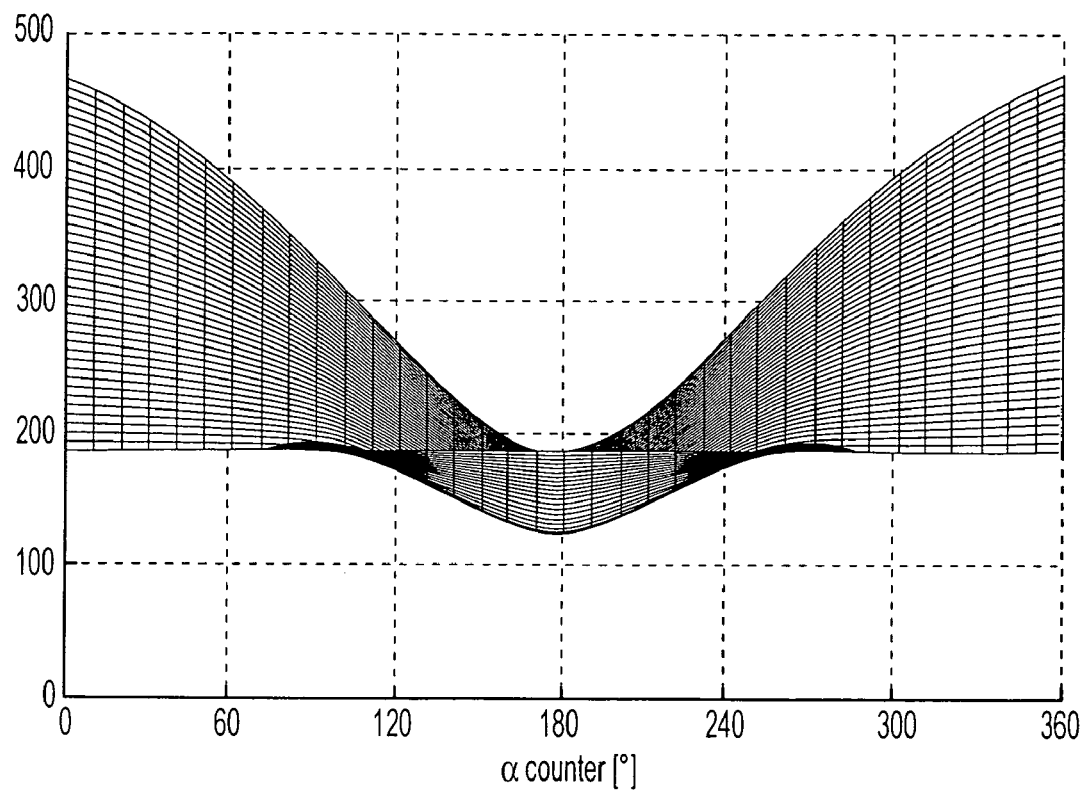
Figure 4B:
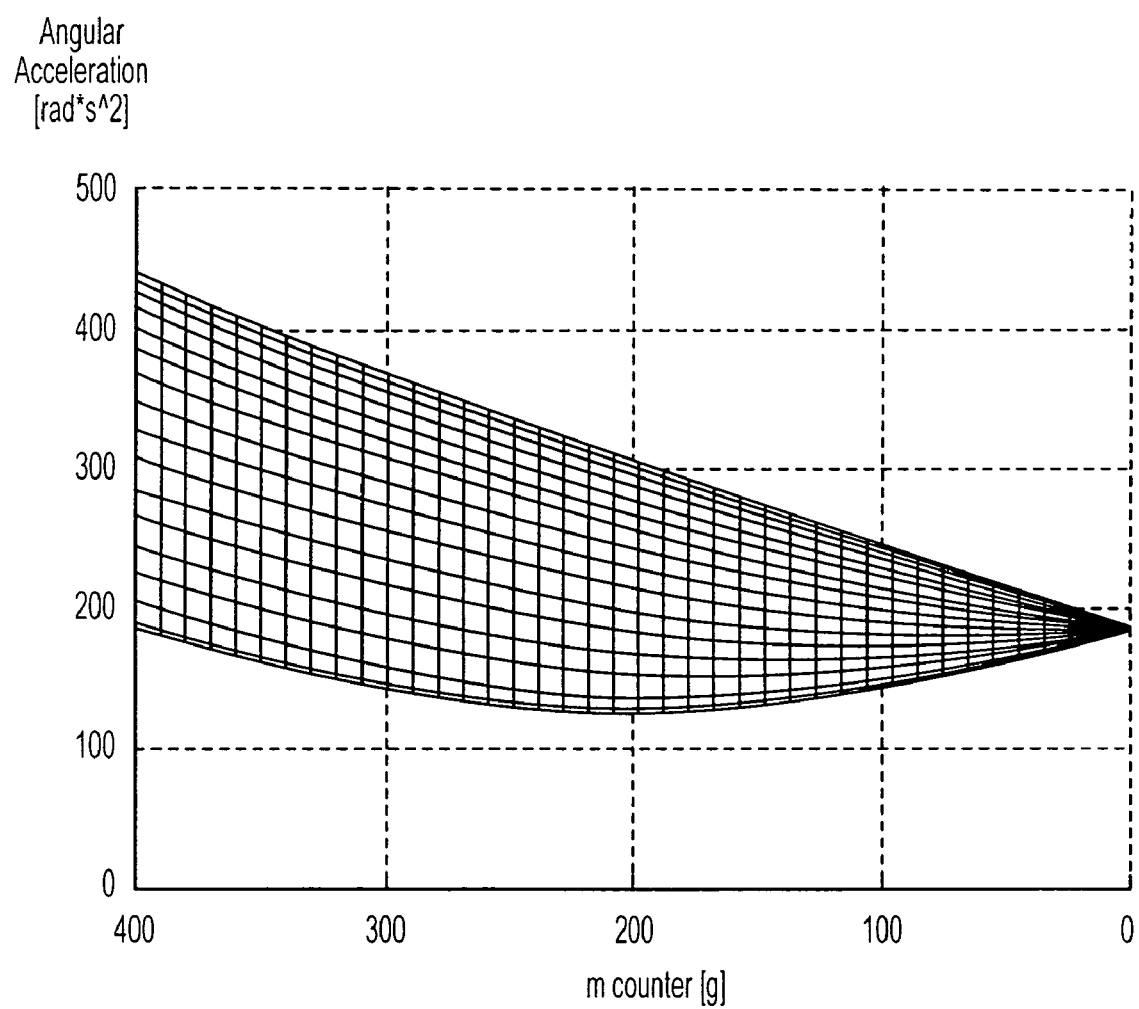
Figure 5A:
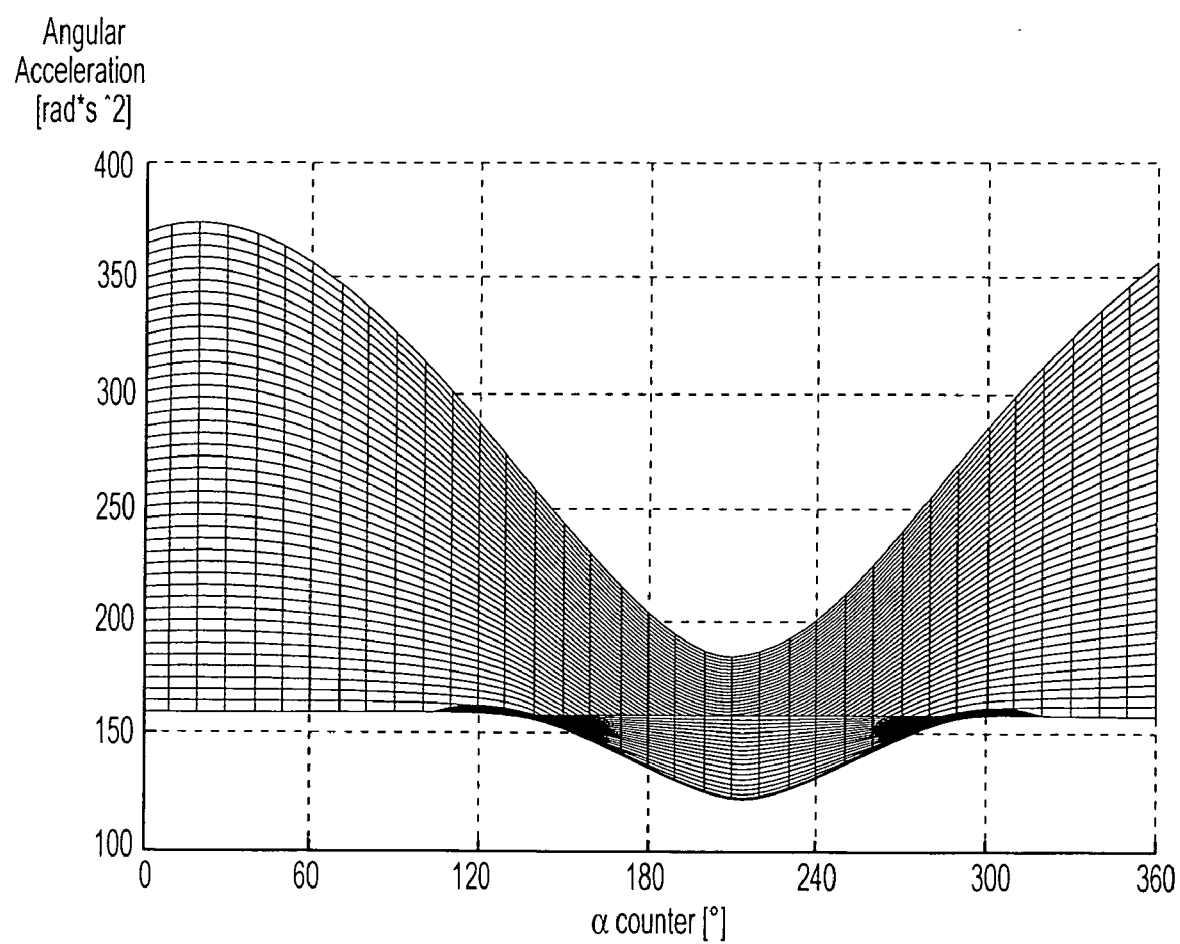
Figure 5B:
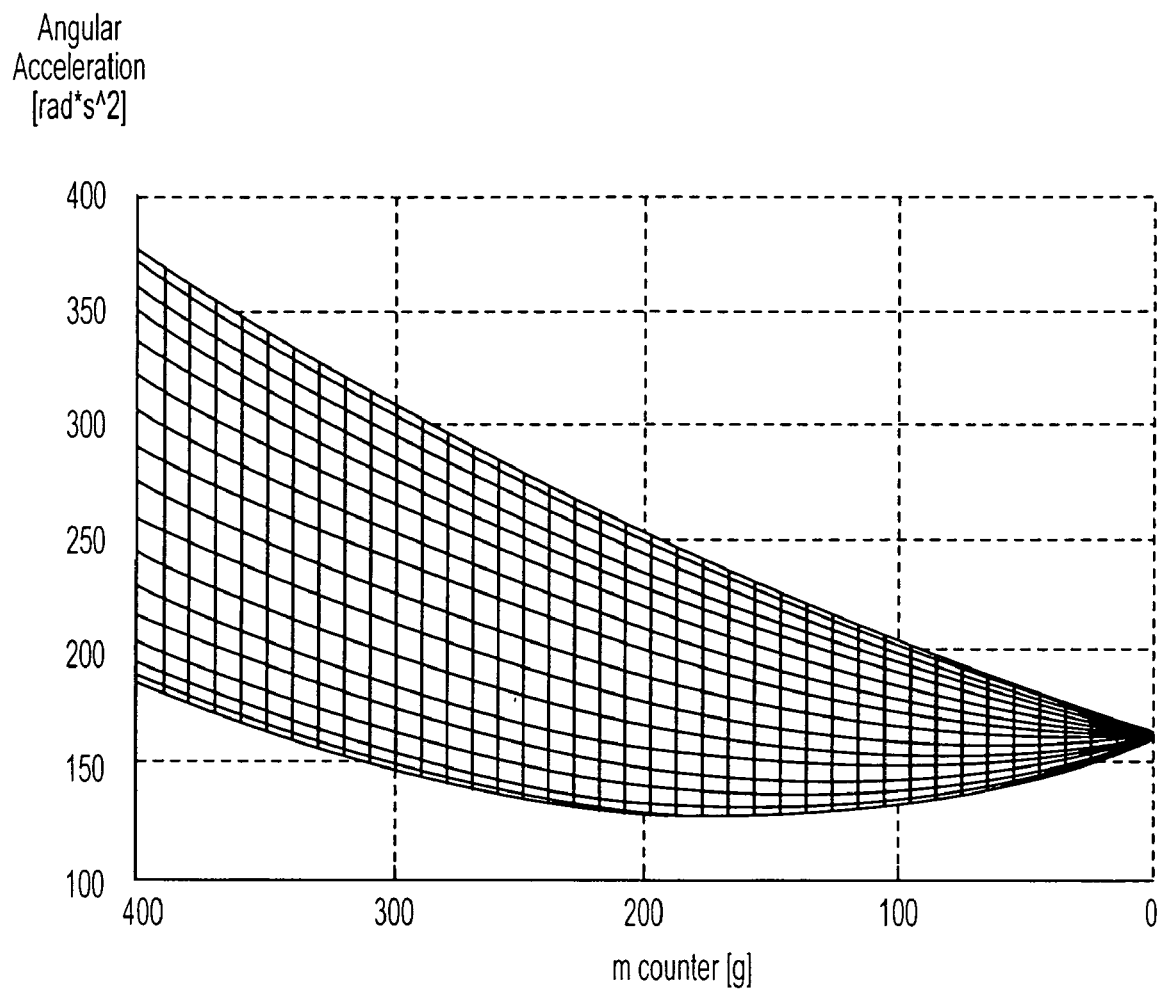

In FIGS. 2-4, then, for this exemplary embodiment, the profile of the amount of the angular acceleration vector (also angular acceleration) $|\vec{\phi}|$ $I = \sqrt{\ddot{\phi}_x^2 + \ddot{\phi}_y^2 + \ddot{\phi}_z^2}$ is plotted as a function of the position and mass of the counterweights 21 and 22, specifically, in FIGS. 3a, 4a, and 4b, for the above (real) case with non-vanishing elements of the secondary diagonals of the inertia matrix I and, in FIGS. 3b, 5a, and 5b, for an ideal case with vanishing elements of the secondary diagonals of the inertia matrix I (that is to say, only the main diagonal elements of the abovementioned inertia matrix I are taken into account and all the secondary diagonal elements are set equal to zero in equation (5)). In this instance, the entire drive is in each case assumed to be a rigid body.

It is evident from the comparison of FIG. 4a with FIG. 5a that the position of the minimum of the amount of angular acceleration varies as a function of the inertia matrix I. Whereas, according to FIG. 5a, in the (ideal) case with vanishing elements of the secondary diagonals of the inertia matrix I, the minimum of the angular acceleration is obtained with an angle of $\alpha_{counter}$=210°=0.2165 kg and a counterweight mass of $$m_{counter} = \frac{1}{4} \cdot \sqrt{3} \cdot m_{OSC},$$

in the real case with non-vanishing elements of the secondary diagonals of the inertia matrix I, in equation (5), the minimum of angular acceleration is obtained at an angle of $\alpha_{counter}$=178° and a counterweight mass of $m_{counter}$=0.203 kg.

According to the present disclosure, the amount of the angular acceleration vector (angular acceleration) $|\vec{\phi}|$ $I = \sqrt{\ddot{\phi}_x^2 + \ddot{\phi}_y^2 + \ddot{\phi}_z^2}$ is determined as a function of the position and mass of the counterweights, and the position (that is to say the angle $\alpha_{counter}$) and counterweight mass $m_{counter}$ are selected such that a minimum is obtained for the angular acceleration.

Case 1:

For the ideal case with vanishing elements of the secondary diagonals in the inertia matrix I, the following vectors of the excitation moments are obtained with optimized parameters $\alpha_{counter}$=210°, $m_{counter}$=0.2165 kg, r=0.05 m and a=0.08 m):

$$M_{real} = \begin{pmatrix} 695{,}01 \\ 0 \\ -401{,}24 \end{pmatrix} Nm \quad M_{imaginary} = \begin{pmatrix} -401{,}26 \\ 0 \\ 694{,}96 \end{pmatrix} Nm$$

This results, with the abovementioned inertia matrix I for the angular acceleration vectors, in $$\ddot{\varphi}_{real} = \begin{pmatrix} 88{,}041 \\ -32{,}863 \\ -76{,}273 \end{pmatrix} \frac{rad}{s^2} \quad \ddot{\varphi}_{imaginary} = \begin{pmatrix} -22{,}359 \\ -12{,}086 \\ -82{,}792 \end{pmatrix} \frac{rad}{s^2}$$

and therefore $$\ddot{\varphi} = \sqrt{\ddot{\varphi}_{real}^2 + \ddot{\varphi}_{imaginary}^2} = \begin{pmatrix} 90{,}853 \\ 35{,}01 \\ 112{,}57 \end{pmatrix} \frac{rad}{s^2}$$

$$\ddot{\varphi}_{RSS} = \sqrt{\ddot{\varphi}_x^2 + \ddot{\varphi}_y^2 + \ddot{\varphi}_z^2} = 148{,}82 \frac{rad}{s^2}$$

the amount of the angular acceleration vector (angular acceleration) being designated by $\ddot{\varphi}_{RSS}$. If this case 1 is calculated, instead of with the above mentioned inertia matrix I, on the assumption that all the secondary diagonal elements of the inertia matrix I are equal to zero (that is to say, if only the main diagonal of the inertia matrix I is taken into account), then $$\ddot{\varphi}_{RSS} = 128{,}46 \frac{rad}{s^2}$$

is obtained.

Case 2:

For the real case with non-vanishing elements of the secondary diagonals in the abovementioned inertia matrix I, the following vectors of the excitation moments are obtained with the optimized parameters ($\alpha_{counter}$=178°, $m_{counter}$=0.203 kg, r=0.05 m and a=0.08 m):

$$M_{real} = \begin{pmatrix} 637{,}99 \\ 0 \\ 26{,}26 \end{pmatrix} Nm \quad M_{imaginary} = \begin{pmatrix} -828{,}76 \\ 0 \\ -751{,}98 \end{pmatrix} Nm$$

This results for the angular acceleration vectors in $$\ddot{\varphi}_{real} = \begin{pmatrix} 68{,}695 \\ -16{,}941 \\ -16{,}009 \end{pmatrix} \frac{rad}{s^2} \quad \ddot{\varphi}_{imaginary} = \begin{pmatrix} -67{,}178 \\ -2{,}0563 \\ -77{,}46 \end{pmatrix} \frac{rad}{s^2}$$

and therefore $$\ddot{\varphi} = \sqrt{\ddot{\varphi}_{real}^2 + \ddot{\varphi}_{imaginary}^2} = \begin{pmatrix} 96{,}08 \\ 17{,}065 \\ 79{,}096 \end{pmatrix} \frac{rad}{s^2}$$

$$\ddot{\varphi}_{RSS} = \sqrt{\ddot{\varphi}_x^2 + \ddot{\varphi}_y^2 + \ddot{\varphi}_z^2} = 125{,}614 \frac{rad}{x^2}$$

If this case 2 is calculated, instead of with the abovementioned inertia matrix I, on the assumption that all the secondary diagonal elements of the inertia matrix I are equal to zero (that is to say, if only the main diagonal of the inertia matrix I is taken into account), then $$\ddot{\varphi}_{RSS} = 145{,}5 \frac{rad}{s^2}$$

is obtained.

The amount of the angular acceleration vector (angular acceleration) is therefore lower for the real case with non-vanishing elements of the secondary diagonals of the inertia matrix I, with the abovementioned parameters optimized according to the present disclosure, than in the conventional arrangement with a 30° angle of the countermass (corresponding to a value of $\alpha_{counter}$=210°) for three-cylinder in-line engines. Accordingly, in a three-cylinder engine arrangement where an inertia matrix of the drivetrain of the vehicle does not coincide with the axis of rotation of the crankshaft, a counter balance arrangement having counterweights positioned away from a 30° angle may provide reduced angular acceleration during engine operation resulting in improved engine balancing.

By contrast, the latter arrangement with $\alpha_{counter}$=210° corresponds to the optimum for the ideal case that the secondary diagonal elements of the inertia matrix are equal to zero, that is to say the crankshaft axis coincides with the main inertia axis of the drive. In such an arrangement the counterweights may have a typical mass of 198 g.

It will be appreciated that the mass and position of various engine components may be considered when determining a configuration of the counter balance arrangement. For example, the mass of the pistons and the connecting rods may be used to determine the position and mass of each counterweight of the counter balance arrangement. Further, the sum of the various inertias of the powertrain may be used to determine the position and mass of each counter mass of the counter balance arrangement.

In one example, for a three cylinder engine with a powertrain inertia matrix that does not coincide with an axis of rotation of a crankshaft resulting in unbalanced masses, a first counterweight may be positioned at an angle ranging from $\alpha_{counter}$=178°-188°. As shown above, the range of angles may provide the lowest amount of angular acceleration and thus may improve NVH of the engine. In one particular example, for a three cylinder engine with a powertrain inertia matrix that does not coincide with an axis of rotation of a crankshaft resulting in unbalanced masses, a first counterweight may be positioned at an angle of $\alpha_{counter}$=188° and a $m_{counter}$=149 g. In some cases, the first counterweight may balance translational moving masses of the engine. Further, a second counterweight may have the same mass ($m_{counter}$=149 g) but may be turned by 180°. In some cases, the second counterweight may balance rotational moving masses of the engine. Since the three cylinder engine may be positioned in a vehicle such that the axis of rotation of the crankshaft is not aligned with the inertia matrix of the powertrain the configuration of the counter balance arrangement may differ in position and mass from that of a counter balance arrangement where the axis of rotation of the crankshaft is aligned with the inertia matrix of the powertrain. That is, the counter balance arrangement may differ from an longitudinal engine configuration where the angle of the counterweights typically may equal to 210° and each counterweight has a mass of approximately 198 g, for example for a given set of boundaries.

It will be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A counterweight arrangement for an internal combustion engine with three cylinders, the internal combustion engine having a crankshaft rotating about an axis of rotation, with three cranks which succeed one another in the axial direction with respect to the axis of rotation and are distributed at angular intervals of 120° and each crank corresponding to a respective cylinder, the counterweight arrangement comprising:

at least two counterweights for at least partial compensation of inertia forces caused by rotating masses on the crankshaft, wherein exactly two counterweights are provided for the two outer cranks, at least one of the two counterweights being arranged in a position which is rotated about the crankshaft axis with respect to an assigned crank through angle ($\alpha_{counter}$), the amount of which differs from 30°+N*180°, N being equal to a natural number or equal to zero.

2. The counterweight arrangement according to claim 1, wherein the two counterweights are arranged in a common plane which is rotated about the crankshaft axis with respect to each of the two outer cranks through the angle ($\alpha_{counter}$), the amount of which differs from 30°+N*180°.

3. The counterweight arrangement according to claim 1, wherein the orientation of the axis of rotation does not coincide with a main inertia axis of an inertia matrix of the drivetrain.

4. The counterweight arrangement according to claim 1, wherein the internal combustion engine does not include a balancing shaft.

5. A method for optimizing the vibration behavior in an internal combustion engine with three cylinders, the internal combustion engine having a crankshaft rotating about an axis of rotation, with three cranks which succeed one another in the axial direction with respect to the axis of rotation and are distributed at angular intervals of 120°, a counterweight arrangement with at least two counterweights being provided for at least partial compensation of the inertia forces caused by rotating masses on the crankshaft, the method comprising:

calculating an amount of angular acceleration occurring during the rotation of the crankshaft for different values of an angle ($\alpha_{counter}$) through which one of the two counterweights is rotated about the crankshaft axis with respect to the assigned crank;

arranging the respective counterweights in a position based on the lowest value of the calculated amount of angular accelerations;

calculating an amount of angular acceleration occurring during the rotation of the crankshaft for different values of the mass ($m_{counter}$) of the two counterweights; and selecting a mass ($m_{counter}$) of the two counterweights equal to the value of the mass for which the lowest amount of the angular acceleration was calculated;

wherein at least one of the two counterweights is arranged in a position which is rotated about the crankshaft axis with respect to the assigned crank through angle ($\alpha_{counter}$), the amount of which differs from 30°+N*180°, N being equal to a natural number or equal to zero.

6. The method according to claim 5, wherein the two counterweights are rotated about the crankshaft axis with respect to one another through an angle of 180°.

7. A vehicle system having a drivetrain to distribute power to propel the vehicle, the system comprising:
a three cylinder internal combustion engine;
a crankshaft having an axis of rotation that is not aligned with an inertia matrix of the drivetrain of the vehicle, the crankshaft including three cranks distributed along a length of the crankshaft, each crank corresponding to a respective cylinder of the three cylinder engine, wherein the three cranks are distributed at angular intervals of 120° on the crankshaft; and
a counterbalance arrangement having a first counterweight corresponding to a first outer crank of the crankshaft and a second counterweight corresponding to a second outer crank of the crankshaft, wherein the first counterweight is positioned away from an angle of 210° in relation to the first outer crank.

8. The system according to claim 7, wherein the first counterweight is positioned at an angle ranging from 178° to 188° in relation to the first outer crank.

9. The system according to claim 7, wherein the first counterweight is positioned at 188° in relation to the first outer crank.

10. The system according to claim 7, wherein the first and second counterweights are arranged at an angle of 180° with respect to one another in a common plain which runs perpendicularly with respect to the axis of rotation of the crankshaft.

11. The system according to claim 7, wherein the counterbalance arrangement is integral with the crankshaft.

12. The system according to claim 7, wherein the three cylinder internal combustion engine system does not include a balancing shaft.

13. The system according to claim 7, wherein the three cylinder internal combustion engine is positioned transversely in the vehicle.

14. The system according to claim 12, wherein the three cylinder internal combustion engine is a front wheel drive configuration.

15. The system according to claim 7, wherein the mass of the first counterweight is 149 grams.

16. The system according to claim 7, wherein the mass of the second counterweight is 149 grams.

17. The system according to claim 7, wherein the three cylinder internal combustion engine is transversely positioned in the vehicle, the three cylinder internal combustion does not include a balancing shaft, the counterbalance arrangement is integral to the crankshaft, the first counterweight is positioned at 188° and the first counterweight has a mass of 149 grams.

18. The system according to claim 16, wherein the first and second counterweights are arranged at an angle of 180° with respect to one another in a common plain which runs perpendicularly with respect to the axis of rotation of the crankshaft.

* * * * *